Figures 1, 2:
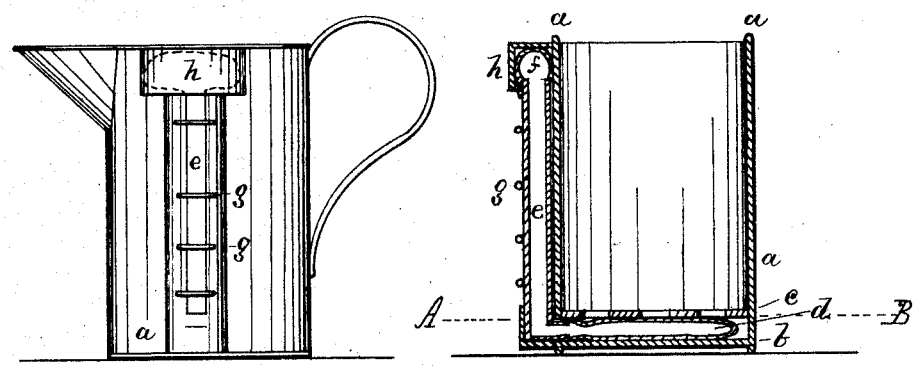

J. McINNES.
Liquid-Measures.

No. 161,625.   Patented April 6, 1875.

Witnesses
John Gorman
Henry Elmer

Inventor
John McInnes
per John Inglis Jr & Co
Att'ys

THE GRAPHIC CO. PHOTO-LITH. 39 & 41 PARK PLACE, N.Y.

UNITED STATES PATENT OFFICE.

JOHN McINNES, OF JERSEY CITY HEIGHTS, NEW JERSEY.

IMPROVEMENT IN LIQUID-MEASURES.

Specification forming part of Letters Patent No. 161,625, dated April 6, 1875; application filed January 28, 1875.

*To all whom it may concern:*

Be it known that I, JOHN McINNES, of Jersey City Heights, in the county of Hudson and State of New Jersey, have invented a new and Improved Device for Indicating Quantity of Liquid by Weight, of which the following is a specification:

The object of my invention is to enable the dealer, by the use of one utensil, to ascertain accurately the amount of liquid contained therein automatically and correctly, the weight of the liquid in the utensil being the operative medium; and my invention consists in providing, in combination with the vessel itself as a part thereof, a tube located vertically on the wall of the vessel, mug, or measure, and having a bulb or chamber formed of india-rubber at its top, and a another similar bulb connecting therewith at the bottom of the said tube, but inside the vessel, can, mug, or or measure. The said lower bulb is placed flat upon the bottom of the mug or measure, and having over it a perforated plate or false bottom of the mug or measure.

The lower bulb is filled with a liquid of proper color, that will show regularly in the tube, (which is made of glass,) so that said liquid may be seen readily. The lower bulb being full, and the upper one empty, as also the tube is empty, it will readily be understood that, as any liquid, such as beer, milk, &c., be poured into the mug or measure, the weight thereof, or downward pressure upon the lower or inside bulb of rubber, would force the measuring or marking liquid out and into the tube, through which it would ascend, and, passing certain gage-marks, give or indicate the exact amount or measure of the liquid within the mug or measuring-vessel.

The false or perforated bottom plate inside the vessel is adjustable, although a permanent part of said vessel; and the apertures therein are sufficiently large to allow the liquid to come in contact with the bulb beneath, and between it and the bottom proper of the vessel. The object of this plate is to keep or hold the lower bulb in proper position to receive the contact of the liquid as the vessel is filled.

The liquid used as a means of indicating, and contained within the lower tube, can be regulated when it is first put in so as to indicate accurately, and its color also regulated so as to show clearly, just the amount of liquid entering the vessel and pressing downward upon the inside rubber bulb. Thus, one vessel is made to serve the purpose of several, and pints, quarts, gallons, or other divisions accurately and rapidly measured off as desired. It is always ready for use; and may be upset at pleasure without sustaining injury to any of its parts.

The gage-marks would vary somewhat according to the density of the liquid to be gaged, and two or more sets or marks may be used— one set for beer, and the other for milk, &c.

Figures 3, 5:
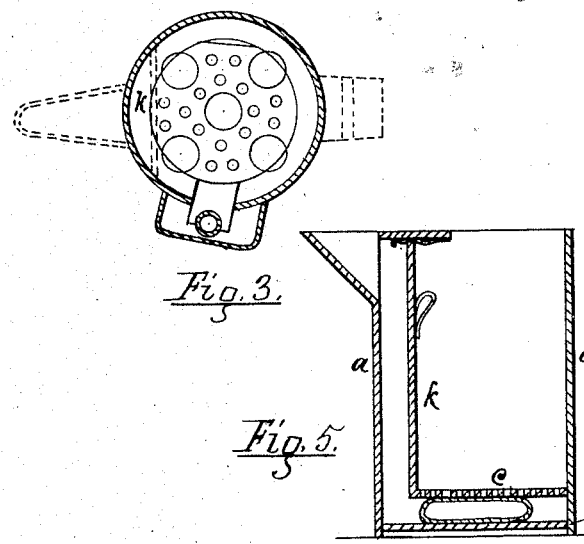
Figure 4:
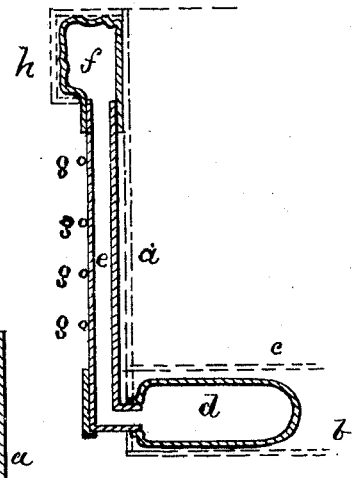

Figure 1 is an elevation of the vessel, showing the tube on the outside, division-marks, or gage, &c. Fig. 2 is a vertical section of the vessel. Fig. 3 is a horizontal section on line A B of Fig. 2. Fig. 4 is a view, showing the two bulbs with the glass tube connecting. Fig. 5 is a vertical section crosswise to Fig. 2.

*a* represents the vertical walls of the measuring-vessel. *b* represents the bottom thereof. *c* represents the perforated plate or interior false bottom of the vessel, located at a suitable height from bottom *b*, and having apertures of suitable size and number to allow contact of liquid in the vessel with the bulb beneath plate *c*. At *b* is shown lower bulb, which I flatten out somewhat, that form being better adapted to receive the pressure from above, and the plate *c* operates to hold it in that position. However, as liquids press equally in all directions, the form of bulb does not affect the result. The glass tube is shown at *e*, and the upper bulb at *f*, inclosed in a casing to preserve it in safety. A specimen of the indicating or gage marks is shown at *g*, which marks are regulated for their office when the vessel is first made, or whenever desired. Gage-marks for beer may be put on one side next the tube, and those for milk put on the other side, and others also added in any of the usual forms, so as to answer for liquids of different density.

The glass tube *e* might be arranged and located inside the walls *a* of the vessel without changing the effect and with the same result, of course protected from contact with the liquid, and having a slot through the walls *a* of the vessel, whereby the tube *e* might be seen.

I have shown the arrangement which I consider the best for practical use.

In Fig. 5, at K, is shown a partition extending upward from plate c, and connected therewith, so that both may be lifted out together for cleaning purposes. The partition K is useful in keeping back foam from the spout of the mug in pouring out frothy liquids, such as ale, &c. In this case the liquid must flow downward through plate c, and up behind partition K to the spout. It is also useful in holding down plate c, and in lifting it out, when desired.

What I claim as new, and desire to secure by Letters Patent of the United States, is—

1. As a means of indicating the amount of liquids in a vessel by the pressure thereof the bulbs d and f, with connecting-tube e, combined to operate substantially as described and set forth.

2. In a measuring-vessel, the combination composed of the following elements, viz., perforated plate or false bottom c, bulb d, tube e, bulb f, protecting-plate h, with gage g, substantially as and for the purpose described and set forth.

JOHN McINNES.

In presence of—
   JOHN INGLES, Jr.,
   HENRY ELMER.